United States Patent
Tanabe et al.

(10) Patent No.: US 11,309,136 B2
(45) Date of Patent: Apr. 19, 2022

(54) ELECTROLYTE SOLUTION FOR ELECTROLYTIC CAPACITOR AND ELECTROLYTIC CAPACITOR UTILIZING SAID ELECTROLYTE SOLUTION

(71) Applicant: SANYO CHEMICAL INDUSTRIES, LTD., Kyoto (JP)

(72) Inventors: Fumiyuki Tanabe, Kyoto (JP); Takahiro Shiba, Kyoto (JP); Yoshihiko Akazawa, Kyoto (JP); Takao Mukai, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 889 days.

(21) Appl. No.: 16/075,992

(22) PCT Filed: Feb. 8, 2017

(86) PCT No.: PCT/JP2017/004635
§ 371 (c)(1),
(2) Date: Aug. 7, 2018

(87) PCT Pub. No.: WO2017/138578
PCT Pub. Date: Aug. 17, 2017

(65) Prior Publication Data
US 2021/0193394 A1 Jun. 24, 2021

(30) Foreign Application Priority Data

Feb. 8, 2016 (JP) .............................. JP2016-021956
Oct. 7, 2016 (JP) .............................. JP2016-198844

(51) Int. Cl.
*H01G 9/035* (2006.01)
*H01G 9/145* (2006.01)

(52) U.S. Cl.
CPC .............. *H01G 9/035* (2013.01); *H01G 9/145* (2013.01)

(58) Field of Classification Search
CPC ............................. H01G 9/035; H01G 9/145
See application file for complete search history.

(56) References Cited

FOREIGN PATENT DOCUMENTS

| | | |
|---|---|---|
| CN | 1914503 | 2/2007 |
| CN | 101452767 | 6/2009 |
| JP | H0745482 | 2/1995 |
| JP | H9-213583 | 8/1997 |
| JP | 2002208311 | 7/2002 |
| JP | 2003246824 | 9/2003 |
| JP | 2006186213 | 7/2006 |
| JP | 2009088128 | 4/2009 |
| WO | WO-2018003876 A1 * | 1/2018 ............. H01G 9/145 |

OTHER PUBLICATIONS

"Office Action of Japan Counterpart Application" with English translation thereof, dated Dec. 1, 2020, p. 1 -p. 7.
"Office Action of China Counterpart Application," with English translation thereof, dated Jul. 29, 2019, p. 1-p. 14.
"Search Report of Europe Counterpart Application", dated Aug. 28, 2019, p. 1-p. 8.
"International Preliminary Report on Patentability; this report contains the following items :Form PCT/IB/373, PCT/ISA237(cover sheet), PCT/ISA237(Box No. I),PCT/ISA237(Box No. V),", dated Aug. 14, 2018, which is English translation of "Written Opinion of the International Searching Authority", p. 1-p. 12.
Office Action of Taiwan Counterpart Application, with English translation thereof, dated Sep. 7, 2018, pp. 1-10.
"Office Action of Indonesia Counterpart Application," with English translation thereof, dated Nov. 19, 2019, p. 1-p. 4.
"International Search Report (Form PCT/ISA/210) "of PCT/JP2017/004635, dated May 9, 2017, with English translation thereof, pp. 1-4.

* cited by examiner

*Primary Examiner* — David M Sinclair
(74) *Attorney, Agent, or Firm* — JCIPRNET

(57) ABSTRACT

The purpose of the present invention is to provide an electrolyte solution for an electrolytic capacitor which has high withstand voltage. The electrolyte solution for an electrolytic capacitor that is used contains: an organic solvent; an acrylic polymer which has hydroxy group and/or carboxy group; and an electrolyte. A concentration of hydroxy groups included in the organic solvent is 10 mmol/g or less with respect to the weight of the organic solvent.

13 Claims, No Drawings

ELECTROLYTE SOLUTION FOR ELECTROLYTIC CAPACITOR AND ELECTROLYTIC CAPACITOR UTILIZING SAID ELECTROLYTE SOLUTION

CROSS-REFERENCE TO RELATED APPLICATION

This application is a 371 application of the international PCT application serial no. PCT/JP2017/004635, filed on Feb. 8, 2017, which claims the priority benefit of Japan applications no. 2016-021956 and no. 2016-198844, filed respectively on Feb. 8, 2016 and Oct. 7, 2016. The entirety of each of the abovementioned patent applications is hereby incorporated by reference herein and made a part of this specification.

TECHNICAL FIELD

The present invention relates to an electrolyte solution for an electrolytic capacitor and an electrolytic capacitor utilizing the electrolyte solution.

BACKGROUND ART

Electrolytic capacitors are widely used in various electrical appliances and electronic products, and applications thereof are diverse, for example, charge accumulation, noise removal, and phase adjustment. In recent years, in order for an electrolytic capacitor to operate at a higher drive voltage, there has been an increasing need to improve a withstand voltage, and various improvements have been attempted.

For example, Patent Literature 1 discloses a technology for improving a withstand voltage by adding a polyhydric alcohol to an electrolyte solution containing a solvent and a specific electrolyte salt.

CITATION LIST

Patent Literature

[Patent Literature 1]
Japanese Unexamined Patent Application Publication No. H9-213583

SUMMARY OF INVENTION

Technical Problem

However, in the method described in Patent Literature 1, there is a limit to an effect of improving a withstand voltage, and the effect of improving a withstand voltage is insufficient.

An objective of the present invention is to provide an electrolyte solution for an electrolytic capacitor having a high withstand voltage.

Solution to Problem

The inventors conducted studies in order to achieve the above objective, and thus developed the present invention. That is, the present invention provides an electrolyte solution for an electrolytic capacitor including a solvent containing an organic solvent, an acrylic polymer having hydroxy group and/or carboxy group, and an electrolyte in which a concentration of hydroxy groups included in the organic solvent is 10 mmol/g or less with respect to the weight of the organic solvent, and an electrolytic capacitor including the electrolyte solution for an electrolytic capacitor.

Advantageous Effects of Invention

The electrolyte solution for an electrolytic capacitor of the present invention has an excellent effect of improving a withstand voltage and has higher conductivity.

DESCRIPTION OF EMBODIMENTS

An electrolyte solution for an electrolytic capacitor of the present invention includes a solvent containing an organic solvent, an acrylic polymer having hydroxy group and/or carboxy group, and an electrolyte. A concentration of hydroxy groups included in the organic solvent is 10 mmol/g or less with respect to the weight of the organic solvent.

In addition, as the electrolytic capacitor, an aluminum electrolytic capacitor, an aluminum solid capacitor and an aluminum hybrid capacitor may be exemplified.

The acrylic polymer having hydroxy group and/or carboxy group in the present invention is not particularly limited as long as an acrylic polymer has both hydroxy group and carboxy group or an acrylic polymer has either hydroxy group or carboxy group. The acrylic polymer is a polymer obtained by polymerizing monomer components including monomers having a (meth)acryloyl group as a main component. The acrylic polymer having hydroxy group and/or carboxy group in the present invention is preferably a polymer that includes monomers having (meth)acryloyl group and hydroxy group and/or monomers having (meth)acryloyl group and carboxy group as essential constituent monomers.

The acrylic polymers having hydroxy group and/or carboxy group may be used alone or two or more thereof may be used in combination.

Here, in this specification, "(meth)acryloyl" refers to both or either of "acryloyl" and "methacryloyl," "(meth)acrylate" refers to both or either of "acrylate" and "methacrylate," "(meth)acrylic" refers to both or either of "acrylic" and "methacrylic," and "(meth)acryloyloxy" refers to both or either of "acryloyloxy" and "methacryloyloxy."

As the monomer having (meth)acryloyl group and hydroxy group in the present invention, a hydroxyalkyl (meth)acrylate having 4 to 12 carbon atoms, an adduct obtained by adding 1 to 5 mol of a lactone having 2 to 12 carbon atoms to the hydroxyalkyl (meth)acrylate having 4 to 12 carbon atoms, and an adduct obtained by adding alkylene oxide having 2 to 10 carbon atoms to the hydroxyalkyl (meth)acrylate having 4 to 12 carbon atoms may be exemplified.

As the hydroxyalkyl (meth)acrylate having 4 to 12 carbon atoms, a monohydroxyalkyl (meth)acrylate having 4 to 12 carbon atoms, a dihydroxyalkyl (meth)acrylate having 4 to 12 carbon atoms, and a trihydroxyalkyl (meth)acrylate having 4 to 12 carbon atoms may be exemplified.

As the monohydroxyalkyl (meth)acrylate having 4 to 12 carbon atoms, 2-hydroxyethyl (meth)acrylate, 2-hydroxypropyl (meth)acrylate, 3-hydroxypropyl (meth)acrylate, 2-hydroxy-1-methylethyl (meth)acrylate, 2-hydroxybutyl (meth)acrylate, 3-hydroxybutyl (meth)acrylate, 4-hydroxybutyl (meth)acrylate, 2-hydroxy-1-methylpropyl (meth)acrylate, 2-hydroxy-2-methylpropyl (meth)acrylate, 3-hydroxy-1-methylpropyl (meth)acrylate, 3-hydroxy-2-methylpropyl (meth)acrylate, 6-hydroxyhexyl (meth)

acrylate, 7-hydroxyheptyl (meth)acrylate and 8-hydroxyoctyl (meth)acrylate may be exemplified.

As the dihydroxyalkyl (meth)acrylate having 4 to 12 carbon atoms, glycerol mono(meth)acrylate may be exemplified.

As the trihydroxyalkyl (meth)acrylate having 4 to 12 carbon atoms, pentaerythritol monoacrylate may be exemplified.

As the lactone having 2 to 12 carbon atoms added to the hydroxyalkyl (meth)acrylate having 4 to 12 carbon atoms, acetolactone, propiolactone, butyrolactone, valerolactone, caprolactone, and laurolactone may be exemplified.

As the adduct obtained by adding 1 to 5 mol of a lactone having 2 to 12 carbon atoms to the hydroxyalkyl (meth) acrylate having 4 to 12 carbon atoms, adducts obtained by adding 5 mol of caprolactone to 2-(meth)acryloyloxyethyl 6-hydroxyhexanoate, 2-(meth)acryloyloxyethyl 5-hydroxydodecanoate and 2-hydroxyethyl (meth)acrylate may be exemplified.

As the alkylene oxide having 2 to 10 carbon atoms added to the hydroxyalkyl (meth)acrylate having 4 to 12 carbon atoms, ethylene oxide, 1,2- or 1,3-propylene oxide, 1,2-, 1,3-, 1,4- or 2,3-butylene oxide, 3-methyltetrahydrofuran, 1,2-decene oxide, styrene oxide and an epihalohydrin (epichlorohydrin, etc.) may be exemplified.

As an adduct obtained by adding 1 to 30 mol of alkylene oxide having 2 to 10 carbon atoms to a hydroxyalkyl (meth)acrylate having 4 to 12 carbon atoms, adducts obtained by adding 30 mol of ethylene oxide to 2-(2-hydroxyethoxy)ethyl (meth)acrylate, 2-(2-(2-hydroxyethoxy)ethoxy)ethyl (meth)acrylate, 2-(10-hydroxydecoxy)ethyl (meth)acrylate and 2-hydroxyethyl (meth)acrylate may be exemplified.

The monomers having (meth)acryloyl group and hydroxy group may be used alone or two or more thereof may be used in combination Among them, in consideration of a withstand voltage, a hydroxyalkyl (meth)acrylate having 4 to 12 carbon atoms is preferable, 2-hydroxyethyl (meth)acrylate, 2-hydroxypropyl (meth)acrylate and 4-hydroxybutyl acrylate are more preferable, and 2-hydroxyethyl (meth)acrylate and 4-hydroxybutyl acrylate are most preferable.

The monomer having (meth)acryloyl group and hydroxy group may be a monomer other than the above exemplified monomers and as long as it is a monomer having (meth) acryloyl group and hydroxy group, it is possible to obtain an effect of improving a withstand voltage.

As the monomer having (meth)acryloyl group and carboxy group in the present invention, adducts obtained by adding an acid anhydride having 4 to 10 carbon atoms to the monomer having (meth)acryloyl group and hydroxy group [for example, 2-(meth)acryloyloxyethyl succinate, 2-(meth)acryloyloxyethyl maleate, 2-(meth)acryloyloxyethyl phthalate and 2-(meth)acryloyloxyethyl hexahydrophthalate], adducts obtained by adding 1 to 5 mol of a lactone having 2 to 12 carbon atoms to (meth)acrylic acid [for example, adducts obtained by adding 5 mol of caprolactone to 2-((meth)acryloyloxy)ethanoic acid, 3-((meth)acryloyloxy) propanoic acid, 4-((meth)acryloyloxy)butanoic acid, 5-((meth)acryloyloxy)pentanoic acid, 6-((meth)acryloyloxy)hexanoic acid and (meth)acrylic acid] and (meth) acrylic acid may be exemplified. Here, as the acid anhydride having 4 to 10 carbon atoms, succinic anhydride, maleic anhydride, phthalic anhydride and hexahydrophthalic anhydride may be exemplified. As the lactone having 2 to 12 carbon atoms, acetolactone, propiolactone, butyrolactone, valerolactone, caprolactone and laurolactone may be exemplified.

The monomers having (meth)acryloyl group and carboxy group may be used alone or two or more thereof may be used in combination.

Among them, in consideration of a withstand voltage, adducts obtained by adding succinic anhydride, maleic anhydride, phthalic anhydride and hexahydrophthalic anhydride to a hydroxyalkyl (meth)acrylate having 4 to 12 carbon atoms are preferable, and 2-(meth)acryloyloxyethyl succinate is more preferable.

As long as a monomer other than the above monomers exemplified as the monomer having (meth)acryloyl group and carboxy group is a monomer having (meth)acryloyl group and carboxy group, it is possible to obtain an effect of improving a withstand voltage.

The acrylic polymer in the present invention may contain a monomer other than the essential constituent monomers as long as the effects of the present invention are not impaired.

Among monomers other than the essential constituent monomers, in consideration of copolymerization and solubility in a solvent, a monomer having (meth)acryloyl group and amino group [a (meth)acrylamide having 3 to 20 carbon atoms [(meth)acrylamide, N,N-dimethyl(meth)acrylamide, N-isopropylacrylamide, dimethylaminopropyl(meth)acrylamide and N,N-dibenzyl(meth)acrylamide, etc.] and dimethylaminoethyl (meth)acrylate, etc.], a monomer having a (meth)acryloyl group and a sulfo group [2-sulfoethyl (meth) acrylate and 2-(meth)acrylamide-2-methylpropanesulfonic acid, etc.], a monomer having (meth)acryloyl group and phospho group [2-((meth)acryloyloxy)ethyl phosphate], an alkyl (meth)acrylate having 4 to 20 carbon atoms [methyl (meth)acrylate, ethyl (meth)acrylate, butyl (meth)acrylate, 2-ethylhexyl (meth)acrylate and lauryl (meth)acrylate, etc.], an ether of a monomer having (meth)acryloyl group and hydroxy group and an alcohol having 1 to 8 carbon atoms (methanol, ethanol, propanol, butanol and octanol, etc.) [2-methoxyethyl (meth)acrylate, 2-(2-methoxyethoxy)ethyl (meth)acrylate, 2-(2-ethoxyethoxy)ethyl (meth)acrylate and 2-(2-octoxyethoxy)ethyl (meth)acrylate, etc.], a styrene derivative having 8 to 20 carbon atoms (styrene, paramethylstyrene, styrenesulfonic acid and vinylbenzoic acid, etc.), and an allyl compound having 3 to 20 carbon atoms (an allyl alcohol, an allyl methyl ether, and an allyl butyl ether, etc.) are preferable, an alkyl (meth)acrylate having 4 to 20 carbon atoms is more preferable, and butyl (meth)acrylate and 2-ethylhexyl (meth)acrylate are most preferable.

The monomers other than the essential constituent monomers may be used alone or two or more thereof may be used in combination.

In consideration of a withstand voltage, the number average molecular weight (hereinafter abbreviated as Mn) of the acrylic polymer having hydroxy group and/or carboxy group in the present invention is preferably 1,000 to 500,000, more preferably 3,000 to 200,000, still more preferably 4,000 to 50,000, and most preferably 4,000 to 15,000.

Mn of the acrylic polymer having hydroxy group and/or carboxy group in the present invention is measured according to gel permeation chromatography (hereinafter abbreviated as GPC) under the following conditions.

Device (an example): HLC-8120 commercially available from Tosoh Corporation
Column (an example): TSK GEL GMH6 two columns [commercially available from Tosoh Corporation]
Measurement temperature: 40° C.
Sample solution: 0.25 weight % in THF solution
Amount of solution injected: 100 µl
Detection device: refractive index detector
Reference material: polystyrene standards (TSK standard POLYSTYRENE) commercially available from Tosoh Corporation, 12 points (weight average molecular weight: 500 1,050 2,800 5,970 9,100 18,100 37,900 96,400 190,000 355,000 1,090,000 2,890,000)

In consideration of a withstand voltage, a proportion of the total number of moles of essential constituent monomers [monomers having (meth)acryloyl group and hydroxy group and monomers having (meth)acryloyl group and carboxy group] to the total number of moles of constituent monomers of the acrylic polymer having hydroxy group and/or carboxy group is preferably 0.5 to 100 mol %, more preferably 5 to 100 mol %, still more preferably 50 to 100 mol %, yet more preferably 80 to 100 mol %, and most preferably 100 mol %. When the proportion of the essential constituent monomers is within such a range, this is effective in improving a withstand voltage.

The reason why a withstand voltage of the electrolytic capacitor becomes favorable when the electrolyte solution for an electrolytic capacitor including a solvent containing an organic solvent, an acrylic polymer having hydroxy group and/or carboxy group and an electrolyte is used is not clear, but is speculated to be the following mechanism. In an electrolytic capacitor which obtains a large electrostatic capacitance using a dielectric having an oxide film formed on a surface of an anode aluminum foil, if a withstand voltage of the dielectric is favorable, a withstand voltage of the electrolytic capacitor is also favorable. When the electrolyte solution contains an acrylic polymer having hydroxy group and/or carboxy group, an acrylic polymer having high affinity with a dielectric due to the hydroxy group and/or the carboxy group interacts with the dielectric, and an effect of protecting the dielectric is thought to be obtained. Then, when a content of the monomer having (meth)acryloyl group and hydroxy group and the monomer having (meth)acryloyl group and carboxy group is larger, the affinity between the acrylic polymer having hydroxy group and/or carboxy group and the dielectric is higher, and an effect of protecting the dielectric by the acrylic polymer having hydroxy group and/or carboxy group is enhanced, and as a result, a withstand voltage is assumed to be improved.

In the acrylic polymer having hydroxy group and/or carboxy group, a proportion of the number of moles of the monomer having (meth)acryloyl group and hydroxy group to the total number of moles of the essential constituent monomers is preferably 25 to 100 mol %, more preferably 60 to 100 mol %, still more preferably 90 to 100 mol %, yet more preferably 95 to 100 mol %, and most preferably 100 mol %.

When the proportion of the monomer having (meth) acryloyl group and hydroxy group is within such a range, this is effective in improving a withstand voltage.

In addition, when the electrolytic capacitor of the present invention contains boric acid and/or a borate ester to be described below, being within the above range is preferable for a structural unit derived from the monomer having (meth)acryloyl group and hydroxy group because hydroxy group included forms a complex with boric acid and/or a borate ester and further improvement in withstand voltage can be expected.

In the acrylic polymer having hydroxy group and/or carboxy group, a proportion of the number of moles of the monomer having (meth)acryloyl group and carboxy group to the total number of moles of the essential constituent monomers is preferably 0 to 75 mol %, more preferably 0 to 40 mol %, still more preferably 0 to 10 mol %, yet more preferably 0 to 5 mol %, and most preferably 0 mol %.

In addition, an acrylic polymer whose proportion of the number of moles of the monomer having (meth)acryloyl group and carboxy group to the total number of moles of the essential constituent monomers is most preferably 0 mol % is an acrylic polymer having hydroxy group and having no carboxy group.

When the proportion of the monomer having (meth) acryloyl group and carboxy group is within such a range, this is effective in improving a withstand voltage.

In order to improve a withstand voltage, a glass transition temperature (hereinafter abbreviated as Tg) of the acrylic polymer having hydroxy group and/or carboxy group is preferably −100 to 80° C., more preferably −80 to 60° C., and most preferably −80 to 56° C.

Tg of the present invention can be measured using a method according to "ASTM D3418-82" using a differential scanning calorimeter ["DSC20" or "SSC/580" commercially available from Seiko Instruments Inc.].

When Tg of the acrylic polymer having hydroxy group and/or carboxy group is within such a range, the following mechanism for improving a withstand voltage can be conceived as a mechanism.

Since an acrylic polymer having Tg in the above range is a relatively flexible polymer, it has high adsorption with respect to the dielectric, and as a result, an effect of protecting the dielectric by the acrylic polymer is further enhanced, and improvement in a withstand voltage is assumed.

The acrylic polymer having hydroxy group and/or carboxy group can be synthesized using a known method (method described in Japanese Unexamined Patent Application Publication No. H 5-117330). For example, the acrylic polymer can be synthesized by a solution polymerization method in which the monomers are reacted with a radical initiator (azobisisobutyronitrile, etc.) in a solvent (toluene, etc.).

The acrylic polymer having hydroxy group and/or carboxy group used in the present invention can be used as a main component of an additive for an electrolytic capacitor.

The additive for an electrolytic capacitor is beneficial because it is possible to produce an electrolyte solution for an electrolytic capacitor having an arbitrary composition by mixing an organic solvent and an electrolyte.

In addition, the additive for an electrolytic capacitor is used in place of "additive (A) for a solid electrolyte for a solid electrolytic capacitor" described in Japanese Unexamined Patent Application Publication No. 2017-4986 to prepare an electrolytic capacitor described in Japanese Unexamined Patent Application Publication No. 2017-4986 and thus can be used as an additive for a solid electrolytic capacitor, which is beneficial.

The additive for an electrolytic capacitor preferably contains boric acid and/or a borate ester to be described below in addition to the acrylic polymer having hydroxy group and/or carboxy group.

When the additive for an electrolytic capacitor contains boric acid and/or a borate ester, in consideration of a withstand voltage, a proportion of the total weight of the boric acid and the borate ester to the total weight of the additive for an electrolytic capacitor is preferably 5 to 50 weight % and more preferably 10 to 40 weight %.

The additive for an electrolytic capacitor can be obtained by, for example, a method in which an acrylic polymer is produced by the solution polymerization method and then the solvent used for production is distilled off by a known method such as drying under reduced pressure.

In addition, as a production method in which the additive for an electrolytic capacitor contains boric acid and/or a borate ester, for example, a method in which an acrylic polymer is produced by the solution polymerization method, boric acid and/or a borate ester is dissolved in a solution used for production, and then the solvent is distilled off by a known method such as drying under reduced pressure may be exemplified.

The electrolyte solution for an electrolytic capacitor of the present invention contains a solvent containing an organic solvent, and a concentration of hydroxy groups included in the organic solvent is 10 mmol/g or less with respect to the weight of the organic solvent (that is, a concentration of hydroxy groups of a compound constituting the organic solvent is 10 mmol/g or less).

As the organic solvent having a hydroxy group concentration of 10 mmol/g or less, an alcohol solvent (ethylene glycol monobutyl ether, and polyethylene glycol (Mn: 600 or less), etc.), an amide solvent (N-methylformamide and N,N-dimethylformamide, etc.), a lactone solvent (α-acetyl-γ-butyrolactone, β-butyrolactone, γ-butyrolactone, γ-valerolactone and δ-valerolactone, etc.), a nitrile solvent (acetonitrile, propionitrile, butyronitrile, acrylonitrile, methacrylonitrile and benzonitrile, etc.), a sulfoxide solvent (dimethyl sulfoxide, methylethyl sulfoxide and diethyl sulfoxide), and a sulfone solvent (sulfolane and ethyl methyl sulfone, etc.) may be exemplified.

The organic solvents having a hydroxy group concentration of 10 mmol/g or less may be used alone or two or more thereof may be used in combination.

Among such organic solvents, in order to improve a withstand voltage, a lactone solvent, a sulfoxide solvent and a sulfone solvent are preferable, a lactone solvent and a sulfone solvent are more preferable, and γ-butyrolactone, sulfolane and ethyl methyl sulfone are most preferable.

In addition, a boiling point of the organic solvent having a hydroxy group concentration of 10 mmol/g or less is preferably 150 to 300° C. in consideration of a lifespan of a capacitor.

An electrolyte solution for an electrical capacitor of the present invention may contain an organic solvent having a hydroxy group concentration of greater than 10 mmol/g, water, or the like as a solvent in addition to the organic solvent having a hydroxy group concentration of 10 mmol/g or less as long as the effects of the present invention are not impaired.

As the organic solvent having a hydroxy group concentration of greater than 10 mmol/g, methyl alcohol, ethylene glycol, and the like may be exemplified.

In order to improve a withstand voltage, a proportion of the weight of the organic solvent having a hydroxy group concentration of 10 mmol/g or less to the total weight of the solvent is preferably 50 to 100 weight %, more preferably 70 to 100 weight %, and most preferably 100 weight %.

The electrolyte solution for an electrolytic capacitor of the present invention contains an electrolyte. A known electrolyte used in the electrolyte solution for an electrolytic capacitor described in Japanese Unexamined Patent Application Publication No. H9-213583 can be used, and an electrolyte including carboxylate ions and ammonium or amidinium is preferable.

As carboxylate ions, anions obtained by removing hydrogen atoms from a carboxy group of a carboxylic acid such as a saturated polycarboxylic acid (oxalic acid, malonic acid, succinic acid, glutaric acid, adipic acid, pimelic acid, suberic acid, azelaic acid, 2-methylazelaic acid, sebacic acid, 1,5-octanedicarboxylic acid, 4,5-octanedicarboxylic acid, 1,9-nonanedicarboxylic acid, 1,10-decanedicarboxylic acid, 1,6-decanedicarboxylic acid, 5,6-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,15-pentadecanedicarboxylic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutyl malonic acid, ethylpropyl malonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, 3,3-dimethylglutaric acid and 3-methyladipic acid, etc.), a saturated monocarboxylic acid (formic acid, acetic acid, propionic acid, butyric acid, isobutyric acid, valeric acid, caproic acid, enanthic acid, caprylic acid, pelargonic acid, lauric acid, myristic acid, stearic acid, behenic acid and undecanoic acid, etc.), an unsaturated monocarboxylic acid [(meth)acrylic acid, crotonic acid and oleic acid, etc.], an unsaturated aliphatic polycarboxylic acid (maleic acid, fumaric acid, itaconic acid and citraconic acid, etc.), an aromatic monocarboxylic acid (benzoic acid, cinnamic acid, naphthoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, hydroxybenzoic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-sec-butylaminobenzoic acid, N-tert-butylaminobenzoic acid, N,N-dimethylaminobenzoic acid and N,N-diethylaminobenzoic acid, etc.) and an aromatic polycarboxylic acid (phthalic acid, isophthalic acid and telephthalic acid, etc.) may be exemplified. Among them, in consideration of conductivity, anions obtained by removing hydrogen atoms from a carboxy group of an unsaturated polycarboxylic acid, an aromatic polycarboxylic acid, or the like are preferable, and anions obtained by removing hydrogen atoms from a carboxy group of maleic acid, phthalic acid, or the like are more preferable.

Ammonium can be used without particular limitation as long as ammonium forms a salt with the carboxylate ions.

As the ammonium, a tertiary ammonium (trimethylammonium, triethylammonium, dimethylethylammonium, dimethylpropylammonium and dimethylisopropylammonium, etc.), a quaternary ammonium (tetramethylammonium, ethyltrimethylammonium, diethyldimethylammonium, triethylmethylammonium, and tetraethylammonium, etc.), and the like may be exemplified.

Amidinium can be used without particular limitation as long as amidinium forms a salt with the carboxylate ion.

As the amidinium, imidazolinium and cations in which hydrogen atoms included in imidazolinium are substituted with an alkyl group (1,2,3,4-tetramethylimidazolinium, 1,3,4-trimethyl-2-ethylimidazolinium, 1,3-dimethyl-2,4-diethylimidazolinium and 1,2-dimethyl-3,4-diethylimidazolinium, etc.), imidazolium and cations in which hydrogen atoms included in imidazolium are substituted with an alkyl group (1,3-dimethylimidazolium, 1,3-diethylimidazolium, 1-ethyl-3-methylimidazolium and 1,2,3-trimethylimidazolium, etc.) and the like may be exemplified.

Among ammonium and amidinium, in consideration of conductivity, amidinium is preferable, cations in which hydrogen atoms included in imidazolinium are substituted with an alkyl group are more preferable, and 1,2,3,4-tetramethylimidazolinium is most preferable.

The electrolytes in the present invention may be used alone or two or more thereof may be used in combination.

The electrolyte in the present invention can be synthesized by a known method [methods described in J. Am. Chem. Soc., 69, 2269 (1947) and U.S. Pat. No. 4,892,944, etc.]. For example, the electrolyte can be synthesized by a method of quaternarizing a tertiary amine using a carbonate ester and then performing acid exchange.

In consideration of a withstand voltage, the electrolyte solution for an electrolytic capacitor of the present invention preferably contains boric acid and/or a borate ester.

As the borate ester, an alkyl borate (triethyl borate, etc.), an aryl borate (triphenyl borate, etc.), and the like may be exemplified.

Among boric acid and the borate ester, boric acid is preferable.

In addition, in consideration of a withstand voltage, the electrolyte solution for an electrolytic capacitor of the present invention preferably contains a polyhydric alcohol (polyvinyl alcohol, mannitol, a polyethylene glycol with Mn of 1,000 or more, etc.) in addition to the acrylic polymer having hydroxy group and/or carboxy group and the solvent.

As the polyvinyl alcohol, commercially available products such as Poval [commercially available from Kuraray Co., Ltd.] and JP-03 [commercially available from Japan VAM & Poval Co., Ltd.] can be used.

In consideration of a withstand voltage, an absolute value of a difference between solubility parameters (hereinafter abbreviated as an SP value) of an acrylic polymer having hydroxy group and/or carboxy group included in an electrolyte solution for an electrolytic capacitor of the present invention and a solvent is preferably 0.1 to 5.0, more preferably 0.5 to 4.5, still more preferably 1.0 to 4.0, and most preferably 3.0 to 4.0. Here, the SP value in the present invention is calculated by a method described in Polymer engineering and science Vol. 14, pages 151 to 154, Robert F Fadors et al.

In addition, in order to further improve a withstand voltage, a value obtained by subtracting an SP value of a solvent from an SP value of an acrylic polymer having hydroxy group and/or carboxy group is preferably 0.1 to 5.0, more preferably 0.5 to 4.5, still more preferably 1.0 to 4.0, and most preferably 3.0 to 4.0.

Here, when the solvent in the electrolyte solution for an electrolytic capacitor is a mixture of a plurality of solvents, a weighted average value using SP values of components and weight proportions of the components is set as an SP value of the solvent.

In addition, when two or more types of acrylic polymers having hydroxy group and/or carboxy group are used in combination as the acrylic polymer having hydroxy group and/or carboxy group, similarly to the SP value of the solvent, a weighted average value of SP values of the acrylic polymers having hydroxy group and/or carboxy group is set as an SP value of the acrylic polymer having hydroxy group and/or carboxy group, and a difference between the above SP values is calculated.

A mechanism by which an absolute value of a difference between SP values of an acrylic polymer having hydroxy group and/or carboxy group and a solvent is set within the above range and thus a withstand voltage is improved is speculated to be as follows. When an absolute value of a difference between SP values of an acrylic polymer having hydroxy group and/or carboxy group and a solvent is larger, the affinity of the acrylic polymer having hydroxy group and/or carboxy group to the dielectric is relatively higher than the affinity to the solvent, an effect of protecting the dielectric by the acrylic polymer having hydroxy group and/or carboxy group is enhanced and as a result, a withstand voltage is assumed to be improved.

In the electrolyte solution for an electrolytic capacitor of the present invention, a weight proportion of the acrylic polymer having hydroxy group and/or carboxy group is preferably 0.5 to 40 weight %, more preferably 1 to 30 weight %, and most preferably 5 to 20 weight % to the total weight of the electrolyte solution for an electrolytic capacitor. When 0.5 weight % or more of the acrylic polymer having hydroxy group and/or carboxy group is contained, a withstand voltage becomes favorable, and when 40 weight % or less of the acrylic polymer having hydroxy group and/or carboxy group is contained, conductivity becomes favorable.

A weight proportion of the solvent to the total weight of the electrolyte solution for an electrolytic capacitor is preferably 50 to 99 weight %, more preferably 50 to 98 weight %, and most preferably 60 to 80 weight % in consideration of conductivity.

A weight proportion of the electrolyte to the total weight of the electrolyte solution for an electrolytic capacitor is preferably 0.5 to 40 weight %, and most preferably 5 to 30 weight % in consideration of conductivity.

When the electrolyte solution for an electrolytic capacitor of the present invention contains boric acid and/or a borate ester, a proportion of the total weight of the boric acid and the borate ester to the total weight of the electrolyte solution for an electrolytic capacitor is preferably 0.1 to 10 weight %, more preferably 0.5 to 5 weight %, and most preferably 1 to 3 weight %.

When the electrolyte solution for an electrolytic capacitor of the present invention contains the polyhydric alcohol, a weight proportion of the polyhydric alcohol to the total weight of the electrolyte solution for an electrolytic capacitor is preferably 0.1 to 10 weight %, more preferably 0.5 to 5 weight %, and most preferably 1 to 3 weight %.

When the electrolyte solution for an electrolytic capacitor of the present invention contains water, a weight proportion of water to the total weight of the electrolyte solution for an electrolytic capacitor is preferably 0.01 to 5 weight %, and more preferably 0.1 to 3 weight % in consideration of production efficiency of aluminum oxide.

A content of water can be measured by a Karl Fischer moisture meter.

A method of producing the electrolyte solution for an electrolytic capacitor of the present invention is not particularly limited. For example, the electrolyte solution can be produced by uniformly mixing the organic solvent having a hydroxy group concentration of 10 mmol/g or less, the acrylic polymer having hydroxy group and/or carboxy group, and the electrolyte in a temperature range of 20 to 200° C. using a known mechanical mixing method (for example, a method using a mechanical stirrer or a magnetic stirrer).

The shape, size, and the like of the electrolytic capacitor of the present invention are not limited as long as the electrolyte solution for an electrolytic capacitor of the present invention is contained. For example, a winding type electrolytic capacitor which is a capacitor formed by winding an anode (aluminum oxide foil) having aluminum oxide formed on a surface of an anode and a cathode aluminum foil with a separator therebetween may be exemplified.

The electrolytic capacitor of the present invention can be obtained by impregnating the electrolyte solution for an electrolytic capacitor of the present invention as a driving electrolyte solution into a separator (kraft paper and manila paper, etc.), and accommodating it in a cylindrical aluminum case with a bottom together with anode and cathode, and then sealing an opening of the aluminum case using a sealing rubber (butyl rubber and silicone rubber, etc.).

EXAMPLES

The present invention will be described below in detail with reference to examples. However, the present invention is not limited to the following examples.

In the following description, "parts" indicates "parts by weight."

In addition, Mn of the acrylic polymer having hydroxy group and/or carboxy group synthesized in Production Examples 1 to 23 was measured according to GPC under the following conditions.
Device (an example): HLC-8120 commercially available from Tosoh Corporation
Column (an example): TSK GEL GMH6 two columns [commercially available from Tosoh Corporation]
Measurement temperature: 40° C.
Sample solution: 0.25 weight % in THF solution
Amount of solution injected: 100 µl
Detection device: refractive index detector
Reference material: polystyrene standards (TSK standard POLYSTYRENE) commercially available from Tosoh Corporation, 12 points (weight average molecular weight: 500 1,050 2,800 5,970 9,100 18,100 37,900 96,400 190,000 355,000 1090,000 2,890,000)

In addition, Tg of the acrylic polymer having hydroxy group and/or carboxy group synthesized in Production Examples 1 to 23 was measured using a differential scanning calorimeter ["DSC20" or "SSC/580" commercially available from Seiko Instruments Inc.] according to "ASTM D3418-82."
<Synthesis of Acrylic Polymer Having Hydroxy Group and/or Carboxy Group>

Production Example 1: Synthesis of Acrylic Polymer 1 Having Hydroxy Group and/or Carboxy Group 30 parts of toluene [commercially available from Wako Pure Chemical Industries, Ltd.], 2.1 parts (29 mmol) of acrylic acid [commercially available from Wako Pure Chemical Industries, Ltd.] and 12.0 parts (93.6 mmol) of butyl acrylate [commercially available from Wako Pure Chemical Industries, Ltd.] were put into a flask including a stirrer, a thermometer and a cooling pipe attached thereto and heated to 80° C. with stirring. A solution in which 0.9 parts of azobisisobutyronitrile [commercially available from Wako Pure Chemical Industries, Ltd.] was dissolved in 5 parts of toluene was added dropwise thereto over 3 hours. After dropwise addition was completed, the mixture was additionally heated for 3 hours with stirring while the temperature was maintained at 80° C. Then, the mixture was heated at 100° C. under a reduced pressure of 0.5 kPa, toluene was distilled off, and an acrylic polymer 1 having hydroxy group and/or carboxy group was synthesized. Mn was 5,500, the SP value was 10.4, and Tg was −40° C.

Production Example 2: Synthesis of Acrylic Polymer 2 Having Hydroxy Group and/or Carboxy Group An acrylic polymer 2 having hydroxy group and/or carboxy group was synthesized in the same manner as in Production Example 1 except that 12.0 parts (65.1 mmol) of acrylic acid 2-ethylhexyl [commercially available from Wako Pure Chemical Industries, Ltd.] was used in place of 12.0 parts (93.6 (mmol) of butyl acrylate in Production Example 1. Mn was 5,300, the SP value was 9.94, and Tg was −55° C.

Production Example 3: Synthesis of Acrylic Polymer 3 Having Hydroxy Group and/or Carboxy Group An acrylic polymer 3 having hydroxy group and/or carboxy group was synthesized in the same manner as in Production Example 1 except that 8.3 parts (116 mmol) of acrylic acid was used in place of 2.1 parts (29 mmol) of acrylic acid, and 5.8 parts (50 mmol) of 2-hydroxyethyl acrylate [commercially available from Wako Pure Chemical Industries, Ltd.] was used in place of 12.0 parts (93.6 mmol) of butyl acrylate in Production Example 1. Mn was 5,400, the SP value was 14.2, and Tg was 45° C.

Production Example 4: Synthesis of Acrylic Polymer 4 Having Hydroxy Group and/or Carboxy Group An acrylic polymer 4 having hydroxy group and/or carboxy group was synthesized in the same manner as in Production Example 1 except that 6.8 parts (94 mmol) of acrylic acid was used in place of 2.1 parts (29 mmol) of acrylic acid, and 7.3 parts (63 mmol) of 2-hydroxyethyl acrylate was used in place of 12.0 parts (93.6 mmol) of butyl acrylate in Production Example 1. Mn was 5,200, the SP value was 14.2, and Tg was 32° C.

Production Example 5: Synthesis of Acrylic Polymer 5 Having Hydroxy Group and/or Carboxy Group An acrylic polymer 5 having hydroxy group and/or carboxy group was synthesized in the same manner as in Production Example 1 except that 4.1 parts (57 mmol) of acrylic acid was used in place of 2.1 parts (29 mmol) of acrylic acid and 10.0 parts (85.9 mmol) of 2-hydroxyethyl acrylate was used in place of 12.0 parts (93.6 mmol) of butyl acrylate in Production Example 1. Mn was 5,300, the SP value was 14.3, and Tg was 11° C.

Production Example 6: Synthesis of Acrylic Polymer 6 Having Hydroxy Group and/or Carboxy Group An acrylic polymer 6 having hydroxy group and/or carboxy group was synthesized in the same manner as in Production Example 1 except that 3.0 parts (41 mmol) of acrylic acid was used in place of 2.1 parts (29 mmol) of acrylic acid and 11.1 parts (95.9 mmol) of 2-hydroxyethyl acrylate was used in place of 12.0 parts (93.6 mmol) of butyl acrylate in Production Example 1. Mn was 5,500, the SP value was 14.4, and Tg was 4° C.

Production Example 7: Synthesis of Acrylic Polymer 7 Having Hydroxy Group and/or Carboxy Group An acrylic polymer 7 having hydroxy group and/or carboxy group was synthesized in the same manner as in Production Example 1 except that 12.0 parts (103 mmol) of 2-hydroxyethyl acrylate was used in place of 12.0 parts (93.6 mmol) of butyl acrylate in Production Example 1. Mn was 6,100, the SP value was 14.4, and Tg was −2° C.

Production Example 8: Synthesis of Acrylic Polymer 8 Having Hydroxy Group and/or Carboxy Group An acrylic polymer 8 having hydroxy group and/or carboxy group was synthesized in the same manner as in Production Example 1 except that 12.0 parts (63.8 mmol) of 2-(2-ethoxyethoxy)ethyl acrylate [product name "Light acrylate EC-A," commercially available from Kyoeisha Chemical Co., Ltd.] was used in place of 12.0 parts (93.6 mmol) of butyl acrylate in Production Example 1. Mn was 6,200, the SP value was 10.4, and Tg was −55° C.

Production Example 9: Synthesis of Acrylic Polymer 9 Having Hydroxy Group and/or Carboxy Group An acrylic polymer 9 having hydroxy group and/or carboxy group was synthesized in the same manner as in Production Example 1 except that 2.1 parts (9.7 mmol) of 2-acryloyloxyethyl succinate [commercially available from Tokyo Chemical Industry Co., Ltd.] was used in place of 2.1 parts (29 mmol) of acrylic acid in Production Example 1. Mn was 5,900, the SP value was 10.2, and Tg was −53° C.

Production Example 10: Synthesis of Acrylic Polymer 10 Having Hydroxy Group and/or Carboxy Group 30 parts of toluene [commercially available from Wako Pure Chemical Industries, Ltd.] and 14.1 parts (121 mmol) of 2-hydroxyethyl acrylate were put into a flask including a stirrer, a thermometer and a cooling pipe attached thereto and heated to 80° C. with stirring. A solution in which 0.9 parts of azobisisobutyronitrile [commercially available from Wako Pure Chemical Industries, Ltd.] was dissolved in 5 parts of toluene was added dropwise thereto over 3 hours. After dropwise addition was completed, the mixture was additionally heated for 3 hours with stirring while the temperature was maintained at 80° C. Then, the mixture was heated at 100° C. under a reduced pressure of 0.5 kPa, toluene was distilled off, and an acrylic polymer 10 having hydroxy group and/or carboxy group was synthesized. Mn was 6,100, the SP value was 14.5, and Tg was −15° C.

Production Example 11: Synthesis of Acrylic Polymer 11 Having Hydroxy Group and/or Carboxy Group An acrylic polymer 11 having hydroxy group and/or carboxy group was synthesized in the same manner as in Production Example 10 except that 14.1 parts (65.2 mmol) of 2-acryloyloxyethyl succinate was used in place of 14.1 parts (121 mmol) of 2-hydroxyethyl acrylate in Production Example 10. Mn was 4,600, the SP value was 12.3, and Tg was −40° C.

Production Example 12: Synthesis of Acrylic Polymer 12 Having Hydroxy Group and/or Carboxy Group An acrylic polymer 12 having hydroxy group and/or carboxy group was synthesized in the same manner as in Production Example 10 except that 30 parts of methyl ethyl ketone [commercially available from Wako Pure Chemical Industries, Ltd.] was used in place of 30 parts of toluene in Production Example 10. Mn was 3,100, the SP value was 14.5, and Tg was −15° C.

Production Example 13: Synthesis of Acrylic Polymer 13 Having Hydroxy Group and/or Carboxy Group An acrylic polymer 13 having hydroxy group and/or carboxy group was synthesized in the same manner as in Production Example 10 except that 0.4 parts of azobisisobutyronitrile was used in place of 0.9 parts of azobisisobutyronitrile in Production Example 10. Mn was 15,000, the SP value was 14.5, and Tg was −15° C.

Production Example 14: Synthesis of Acrylic Polymer 14 Having Hydroxy Group and/or Carboxy Group An acrylic polymer 14 having hydroxy group and/or carboxy group was synthesized in the same manner as in Production Example 10 except that 14.1 parts (97.8 mmol) of 4-hydroxybutyl acrylate [product name "4-HBA," commercially available from Osaka Organic Chemical Industry Ltd.] was used in place of 14.1 parts (121 mmol) of 2-hydroxyethyl acrylate in Production Example 10. Mn was 6,200, the SP value was 13.0, and Tg was −40° C.

Production Example 15: Synthesis of Acrylic Polymer 15 Having Hydroxy Group and/or Carboxy Group An acrylic polymer 15 having hydroxy group and/or carboxy group was synthesized in the same manner as in Production Example 10 except that 14.1 parts (108 mmol) of 2-hydroxypropyl acrylate [commercially available from Tokyo Chemical Industry Co., Ltd.] was used in place of 14.1 parts (121 mmol) of 2-hydroxyethyl acrylate in Production Example 10. Mn was 5,600, the SP value was 13.4, and Tg was −7° C.

Production Example 16: Synthesis of Acrylic Polymer 16 Having Hydroxy Group and/or Carboxy Group An acrylic polymer 16 having hydroxy group and/or carboxy group was synthesized in the same manner as in Production Example 1 except that 12.7 parts (88.2 mmol) of 4-hydroxybutyl acrylate was used in place of 2.1 parts (29 mmol) of acrylic acid and 1.4 parts (10.9 mmol) of butyl acrylate was used in place of 12.0 parts (93.6 mmol) of butyl acrylate in Production Example 1. Mn was 5,800, the SP value was 12.7, and Tg was −42° C.

Production Example 17: Synthesis of Acrylic Polymer 17 Having Hydroxy Group and/or Carboxy Group An acrylic polymer 17 having hydroxy group and/or carboxy group was synthesized in the same manner as in Production Example 10 except that 14.1 parts (88.0 mmol) of glycerin monomethacrylate [product name "BLEMMER GLM" commercially available from NOF Corporation] was used in place of 14.1 parts (121 mmol) of 2-hydroxyethyl acrylate in Production Example 10. Mn was 4,500, the SP value was 15.6, and Tg was 55° C.

Production Example 18: Synthesis of Acrylic Polymer 18 Having Hydroxy Group and/or Carboxy Group An acrylic polymer 18 having hydroxy group and/or carboxy group was synthesized in the same manner as in Production Example 10 except that 14.1 parts (40.9 mmol) of an adduct obtained by adding 2 mol of caprolactone to 2-hydroxyethyl acrylate [product name "SR-495B," commercially available from Sartomer] was used in place of 14.1 parts (121 mmol) of 2-hydroxyethyl acrylate in Production Example 10. Mn was 7,000, the SP value was 11.5, and Tg was −50° C.

Production Example 19: Synthesis of Acrylic Polymer 19 Having Hydroxy Group and/or Carboxy Group An acrylic polymer 19 having hydroxy group and/or carboxy group was synthesized in the same manner as in Production Example 10 except that 14.1 parts (69.0 mmol) of an adduct obtained by adding 2 mol of ethylene oxide to 2-hydroxyethyl acrylate [product name "BLEMMER AE90" commercially available from NOF Corporation] was used in place of 14.1 parts (121 mmol) of 2-hydroxyethyl acrylate in Production Example 10. Mn was 6,500, the SP value was 13.0, and Tg was −50° C.

Production Example 20: Synthesis of Acrylic Polymer 20 Having Hydroxy Group and/or Carboxy Group An acrylic polymer 20 having hydroxy group and/or carboxy group was synthesized in the same manner as in Production Example 1 except that 12.1 parts (168 mmol) of acrylic acid was used in place of 2.1 parts (29 mmol) of acrylic acid and 2.0 parts (17 mmol) of 2-hydroxyethyl acrylate was used in place of 12.0 parts (93.6 mmol) of butyl acrylate in Production Example 1. Mn was 5,500, the SP value was 14.1, and Tg was 81° C.

Production Example 21: Synthesis of Acrylic Polymer 21 Having Hydroxy Group and/or Carboxy Group An acrylic polymer 21 having hydroxy group and/or carboxy group was synthesized in the same manner as in Production Example 1 except that 10.5 parts (146 mmol) of acrylic acid was used in place of 2.1 parts (29 mmol) of acrylic acid and 3.6 parts (31 mmol) of 2-hydroxyethyl acrylate was used in place of 12.0 parts (93.6 mmol) of butyl acrylate in Production Example 1. Mn was 5,300, the SP value was 14.1, and Tg was 66° C.

Production Example 22: Synthesis of Acrylic Polymer 22 Having Hydroxy Group and/or Carboxy Group An acrylic polymer 22 having hydroxy group and/or carboxy group was synthesized in the same manner as in Production Example 1 except that 9.5 parts (132 mmol) of acrylic acid was used in place of 2.1 parts (29 mmol) of acrylic acid and 4.6 parts (40 mmol) of 2-hydroxyethyl acrylate was used in place of 12.0 parts (93.6 mmol) of butyl acrylate in Production Example 1. Mn was 5,600, the SP value was 14.2, and Tg was 56° C.

Production Example 23: Synthesis of Acrylic Polymer 23 Having Hydroxy Group and/or Carboxy Group An acrylic polymer 23 having hydroxy group and/or carboxy group was synthesized in the same manner as in Production Example 1 except that 8.8 parts (122 mmol) of acrylic acid was used in place of 2.1 parts (29 mmol) of acrylic acid and 5.3 parts (41 mmol) of 2-hydroxyethyl methacrylate [commercially available from Tokyo Chemical Industry Co., Ltd.] was used in place of 12.0 parts (93.6 mmol) of butyl acrylate in Production Example 1. Mn was 5,100, the SP value was 13.8, and Tg was 85° C.

Compositions, molecular weights, Tg, SP values, and the like of the acrylic polymers 1 to 23 synthesized in Production Examples 1 to 23 are shown in Table 1.

TABLE 1

| | | Mn | SP value | Tg (° C.) | Type of polar functional group | Constituent monomers Essential constituent monomers | Monomer other than essential constituent monomers | Proportion of total number of moles of essential constituent monomers to total number of moles of constituent monomers of acrylic polymer | Proportion of number of moles of monomers having (meth)acryloyl group and hydroxy group to total number of moles of essential constituent monomers | Proportion of number of moles of monomers having (meth)acryloyl group and carboxy group to total number of moles of essential constituent monomers |
|---|---|---|---|---|---|---|---|---|---|---|
| Production Examples | 1 | 5,500 | 10.4 | −40 | Carboxyl group | Acrylic acid | Butyl acrylate | 24% | 0% | 100% |
| | 2 | 5,300 | 9.94 | −55 | Carboxyl group | Acrylic acid | 2-Ethylhexyl acrylate | 31% | 0% | 100% |

TABLE 1-continued

| | | | | Constituent monomers | | Proportion of total number of moles of essential constituent monomers to total number of moles of constituent monomers of acrylic polymer | Proportion of number of moles of monomers having (meth)acryloyl group and hydroxy group to total number of moles of essential constituent monomers | Proportion of number of moles of monomers having (meth)acryloyl group and carboxy group to total number of moles of essential constituent monomers |
|---|---|---|---|---|---|---|---|---|
| | Mn | SP value | Tg (° C.) | Type of polar functional group | Essential constituent monomers | Monomer other than essential constituent monomers | | | |
| 3 | 5,400 | 14.2 | 45 | Carboxyl group and hydroxy group | Acrylic acid/2-hydroxyethyl acrylate | — | 100% | 30% | 70% |
| 4 | 5,200 | 14.2 | 32 | Carboxyl group and hydroxy group | Acrylic acid/2-hydroxyethyl acrylate | — | 100% | 40% | 60% |
| 5 | 5,300 | 14.3 | 11 | Carboxyl group and hydroxy group | Acrylic acid/2-hydroxyethyl acrylate | — | 100% | 60% | 40% |
| 6 | 5,500 | 14.4 | 4 | Carboxyl group and hydroxy group | Acrylic acid/2-hydroxyethyl acrylate | — | 100% | 70% | 30% |
| 7 | 6,100 | 14.4 | −2 | Carboxyl group and hydroxy group | Acrylic acid/2-hydroxyethyl acrylate | — | 100% | 78% | 22% |
| 8 | 6,200 | 10.4 | −55 | Carboxyl group | Acrylic acid | 2-(2-ethoxyethoxy)ethyl acrylate | 31% | 0% | 100% |
| 9 | 5,900 | 10.2 | −53 | Carboxyl group | 2-Acryloyloxyethyl succinate | Butyl acrylate | 9% | 0% | 100% |
| 10 | 6,100 | 14.5 | −15 | Hydroxy group | 2-Hydroxyethyl acrylate | — | 100% | 100% | 0% |
| 11 | 4,600 | 12.3 | −40 | Carboxyl group | 2-Acryloyloxyethyl succinate | — | 100% | 0% | 100% |
| 12 | 3,100 | 14.5 | −15 | Hydroxy group | 2-Hydroxyethyl acrylate | — | 100% | 100% | 0% |
| 13 | 15,000 | 14.5 | −15 | Hydroxy group | 2-Hydroxyethyl acrylate | — | 100% | 100% | 0% |
| 14 | 6,200 | 13.0 | −40 | Hydroxy group | 4-Hydroxybutyl acrylate | — | 100% | 100% | 0% |
| 15 | 5,600 | 13.4 | −7 | Hydroxy group | 2-Hydroxypropyl acrylate | — | 100% | 100% | 0% |
| 16 | 5,800 | 12.7 | −42 | Hydroxy group | 4-Hydroxybutyl acrylate | Butyl acrylate | 89% | 100% | 0% |
| 17 | 4,500 | 15.6 | 55 | Hydroxy group | Glycerin monomethacrylate | — | 100% | 100% | 0% |
| 18 | 7,000 | 11.5 | −50 | Hydroxy group | Adduct obtained by adding 2 mol of caprolactone to 2-hydroxyethyl acrylate | — | 100% | 100% | 0% |
| 19 | 6,500 | 13.0 | −50 | Hydroxy group | Adduct obtained by adding 2 mol of ethylene oxide to 2-hydroxyethyl acrylate | — | 100% | 100% | 0% |

TABLE 1-continued

| | Mn | SP value | Tg (° C.) | Type of polar functional group | Essential constituent monomers | Monomer other than essential constituent monomers | Proportion of total number of moles of essential constituent monomers to total number of moles of constituent monomers of acrylic polymer | Proportion of number of moles of monomers having (meth)acryloyl group and hydroxy group to total number of moles of essential constituent monomers | Proportion of number of moles of monomers having (meth)acryloyl group and carboxy group to total number of moles of essential constituent monomers |
|---|---|---|---|---|---|---|---|---|---|
| 20 | 5,500 | 14.1 | 81 | Carboxyl group and hydroxy group | Acrylic acid/2-hydroxyethyl acrylate | — | 100% | 9% | 91% |
| 21 | 5,300 | 14.1 | 66 | Carboxyl group and hydroxy group | Acrylic acid/2-hydroxyethyl acrylate | — | 100% | 18% | 82% |
| 22 | 5,600 | 14.2 | 56 | Carboxyl group and hydroxy group | Acrylic acid/2-hydroxyethyl acrylate | — | 100% | 23% | 77% |
| 23 | 5,100 | 13.8 | 85 | Carboxyl group and hydroxy group | Acrylic acid/2-hydroxyethyl methacrylate | — | 100% | 25% | 75% |

<Synthesis of Electrolyte>

Production Example 24

Synthesis of Electrolyte 1

9.7 parts of 2,4-dimethylimidazoline [commercially available from Tokyo Chemical Industry Co., Ltd.] was added dropwise to a mixed solution containing 18.0 parts of dimethyl carbonate [commercially available from Tokyo Chemical Industry Co., Ltd.] and 4.5 parts of methanol [commercially available from Wako Pure Chemical Industries, Ltd.], the mixture was stirred at 120° C. for 15 hours, and a 76 weight % methanol solution of 1,2,3,4-tetramethylimidazolinium methyl carbonate salt was obtained. 16.6 parts of phthalic acid [commercially available from Wako Pure Chemical Industries, Ltd.] was added thereto, and the pressure was reduced under conditions of 50° C. and 1.0 kPa for 3 hours. Then, the temperate was raised to 100° C., the pressure was additionally reduced for 3 hours, and the remaining solvent was distilled off. Thereby, an electrolyte 1 (1,2,3,4-tetramethylimidazolinium phthalate) was obtained.

Production Example 25

Synthesis of Electrolyte 2

An electrolyte 2 (1,2,3,4-tetramethylimidazolinium maleate) was obtained in the same manner as in Production Example 24 except that 11.6 parts of maleic acid was used in place of 16.6 parts of phthalic acid.

Production Example 26

Synthesis of Electrolyte 3

11.4 parts of triethylamine [commercially available from Tokyo Chemical Industry Co., Ltd.] was added dropwise to a dispersion solution in which 18.6 parts of phthalic acid was dispersed in 150 parts of methanol, the mixture was stirred at room temperature for 3 hours, and thereby a triethylammonium phthalate methanol solution was obtained. The obtained solution was heated and distilled under a reduced pressure of 1.0 kPa or less at 110° C. and methanol of the solvent was removed. Thereby, an electrolyte 3 (triethylammonium phthalate) was obtained.

<Preparation of Electrolyte Solution>

Examples 1 to 42 and Comparative Examples 1 to 5

According to the quantities shown in Tables 2 and 3, the acrylic polymers 1 to 23 synthesized in Production Examples 1 to 23, polyethylene glycol [product name "PEG-1000," commercially available from Sanyo Chemical Industries, Ltd. Mn=1,000], boric acid [commercially available from Tokyo Chemical Industry Co., Ltd.], triethyl borate [commercially available from Tokyo Chemical Industry Co., Ltd.], mannitol [commercially available from Tokyo Chemical Industry Co., Ltd.] or polyvinyl alcohol [JP-03, degree of polymerization of 300, commercially available from Japan Vam & Poval Co., Ltd.], solvents [all commercially available from Tokyo Chemical Industry Co., Ltd.], and the electrolyte (the electrolyte 1 produced in Production Example 24, the electrolyte 2 produced in Production Example 25, or the electrolyte 3 produced in Production Example 26) were mixed. Then, the temperature was adjusted to 25° C., the mixture was homogenized by stirring using a mechanical stirrer, and electrolyte solutions of the present invention and comparative electrolyte solutions were prepared. The obtained electrolyte solutions were evaluated according to the following method. The results are shown in Table 2 and Table 3.

TABLE 2

| | | Composition | | | | | | | | | | | | | |
|---|---|---|---|---|---|---|---|---|---|---|---|---|---|---|---|
| | | Solvent | | | | Electrolyte | | Acrylic polymer having hydroxy group and/or carboxy group | | | | Boric acid | Triethyl borate | Polyethylene glycol | Mannitol | Polyvinyl alcohol |
| | | Type of solvent | Amount (parts) | SP value of solvent | Concentration of hydroxy groups (mmol/g) | Type | Amount (parts) | Type | Amount (parts) | Tg (° C.) | SP value of acrylic polymer | Amount (parts) | Amount (parts) | Amount (parts) | Amount (parts) | Amount (parts) |
| Examples | 1 | γ-Butyrolactone | 80 | 10.9 | 0 | Electrolyte 1 | 10 | Acrylic polymer 1 | 10 | −40 | 10.4 | — | — | — | — | — |
| | 2 | γ-Butyrolactone | 80 | 10.9 | 0 | Electrolyte 1 | 10 | Acrylic polymer 2 | 10 | −55 | 9.94 | — | — | — | — | — |
| | 3 | γ-Butyrolactone | 80 | 10.9 | 0 | Electrolyte 1 | 10 | Acrylic polymer 3 | 10 | 45 | 14.2 | — | — | — | — | — |
| | 4 | γ-Butyrolactone | 80 | 10.9 | 0 | Electrolyte 1 | 10 | Acrylic polymer 4 | 10 | 32 | 14.2 | — | — | — | — | — |
| | 5 | γ-Butyrolactone | 80 | 10.9 | 0 | Electrolyte 1 | 10 | Acrylic polymer 5 | 10 | 11 | 14.3 | — | — | — | — | — |
| | 6 | γ-Butyrolactone | 80 | 10.9 | 0 | Electrolyte 1 | 10 | Acrylic polymer 6 | 10 | 4 | 14.4 | — | — | — | — | — |
| | 7 | γ-Butyrolactone | 80 | 10.9 | 0 | Electrolyte 1 | 10 | Acrylic polymer 7 | 10 | −2 | 14.4 | — | — | — | — | — |
| | 8 | γ-Butyrolactone | 80 | 10.9 | 0 | Electrolyte 1 | 10 | Acrylic polymer 8 | 10 | −55 | 10.4 | — | — | — | — | — |
| | 9 | γ-Butyrolactone | 80 | 10.9 | 0 | Electrolyte 1 | 10 | Acrylic polymer 9 | 10 | −53 | 10.2 | — | — | — | — | — |
| | 10 | γ-Butyrolactone | 80 | 10.9 | 0 | Electrolyte 1 | 10 | Acrylic polymer 10 | 10 | −15 | 14.5 | — | — | — | — | — |
| | 11 | γ-Butyrolactone | 80 | 10.9 | 0 | Electrolyte 1 | 10 | Acrylic polymer 11 | 10 | −40 | 12.3 | — | — | — | — | — |
| | 12 | γ-Butyrolactone | 80 | 10.9 | 0 | Electrolyte 1 | 10 | Acrylic polymer 12 | 10 | −15 | 14.5 | — | — | — | — | — |
| | 13 | γ-Butyrolactone | 80 | 10.9 | 0 | Electrolyte 1 | 10 | Acrylic polymer 13 | 10 | −15 | 14.5 | — | — | — | — | — |
| | 14 | γ-Butyrolactone | 80 | 10.9 | 0 | Electrolyte 1 | 10 | Acrylic polymer 14 | 10 | −40 | 13.0 | — | — | — | — | — |
| | 15 | γ-Butyrolactone | 80 | 10.9 | 0 | Electrolyte 1 | 10 | Acrylic polymer 15 | 10 | −7 | 13.4 | — | — | — | — | — |
| | 16 | γ-Butyrolactone | 80 | 10.9 | 0 | Electrolyte 1 | 10 | Acrylic polymer 16 | 10 | −42 | 12.7 | — | — | — | — | — |
| | 17 | γ-Butyrolactone | 80 | 10.9 | 0 | Electrolyte 1 | 10 | Acrylic polymer 17 | 10 | 55 | 15.6 | — | — | — | — | — |
| | 18 | γ-Butyrolactone | 80 | 10.9 | 0 | Electrolyte 1 | 10 | Acrylic polymer 18 | 10 | −50 | 11.5 | — | — | — | — | — |
| | 19 | γ-Butyrolactone | 80 | 10.9 | 0 | Electrolyte 1 | 10 | Acrylic polymer 19 | 10 | −50 | 13.0 | — | — | — | — | — |
| | 20 | γ-Butyrolactone | 80 | 10.9 | 0 | Electrolyte 1 | 10 | Acrylic polymer 20 | 10 | 81 | 14.1 | — | — | — | — | — |
| | 21 | γ-Butyrolactone | 80 | 10.9 | 0 | Electrolyte 1 | 10 | Acrylic polymer 21 | 10 | 66 | 14.1 | — | — | — | — | — |
| | 22 | γ-Butyrolactone | 80 | 10.9 | 0 | Electrolyte 1 | 10 | Acrylic polymer 22 | 10 | 56 | 14.2 | — | — | — | — | — |
| | 23 | γ-Butyrolactone | 80 | 10.9 | 0 | Electrolyte 1 | 10 | Acrylic polymer 23 | 10 | 85 | 13.8 | — | — | — | — | — |

| | | Physical properties | | Evaluation results | |
|---|---|---|---|---|---|
| | | Difference between SP values of acrylic polymer and solvent | Weight proportion of water (%) | Capacitor evaluation | |
| | | | | Conductivity (mS/cm) | Spark voltage (V) |
| Examples | 1 | 0.5 | 0.2 | 5.2 | 110 |
| | 2 | 0.9 | 0.2 | 5.3 | 115 |
| | 3 | 3.3 | 0.2 | 4.8 | 140 |
| | 4 | 3.4 | 0.2 | 5.0 | 145 |
| | 5 | 3.4 | 0.2 | 5.2 | 150 |
| | 6 | 3.5 | 0.2 | 5.3 | 150 |
| | 7 | 3.5 | 0.2 | 5.3 | 155 |
| | 8 | 0.5 | 0.2 | 4.9 | 110 |
| | 9 | 0.7 | 0.2 | 6.1 | 115 |
| | 10 | 3.6 | 0.2 | 5.5 | 155 |
| | 11 | 1.4 | 0.2 | 4.1 | 155 |
| | 12 | 3.6 | 0.2 | 5.5 | 150 |

TABLE 2-continued

| | | | | | | | | |
|---|---|---|---|---|---|---|---|---|
| 13 | — | — | — | — | 3.6 | 0.2 | 5.0 | 155 |
| 14 | — | — | — | — | 2.1 | 0.2 | 5.5 | 160 |
| 15 | — | — | — | — | 2.6 | 0.2 | 5.4 | 150 |
| 16 | — | — | — | — | 1.8 | 0.2 | 5.6 | 150 |
| 17 | — | — | — | — | 4.8 | 0.2 | 5.1 | 150 |
| 18 | — | — | — | — | 0.7 | 0.2 | 5.4 | 130 |
| 19 | — | — | — | — | 2.2 | 0.2 | 5.3 | 140 |
| 20 | — | — | — | — | 3.2 | 0.2 | 4.6 | 110 |
| 21 | — | — | — | — | 3.3 | 0.2 | 4.7 | 115 |
| 22 | — | — | — | — | 3.3 | 0.2 | 4.8 | 140 |
| 23 | — | — | — | — | 3.0 | 0.2 | 4.9 | 110 |

TABLE 3

| | | Composition | | | | | | | | | |
|---|---|---|---|---|---|---|---|---|---|---|---|
| | | Solvent | | | | Electrolyte | | Acrylic polymer having hydroxy group and/or carboxy group | | | Boric acid |
| | | Type of solvent | Amount (parts) | SP value of solvent | Concentration of hydroxy groups (mmol/g) | Type | Amount (parts) | Type | Amount (parts) | Tg (° C.) | SP value of acrylic polymer | Amount (parts) |
| Examples | 24 | γ-Butyrolactone | 89.5 | 10.9 | 0 | Electrolyte 1 | 10 | Acrylic polymer 3 | 0.5 | 15 | 14.2 | — |
| | 25 | γ-Butyrolactone | 50 | 10.9 | 0 | Electrolyte 1 | 10 | Acrylic polymer 3 | 40 | −15 | 14.2 | — |
| | 26 | γ-Butyrolactone | 80 | 10.9 | 0 | Electrolyte 2 | 10 | Acrylic polymer 1 | 10 | −40 | 10.4 | — |
| | 27 | γ-Butyrolactone | 70 | 10.9 | 0 | Electrolyte 1 | 10 | Acrylic polymer 3 | 10 | 45 | 14.2 | — |
| | 28 | γ-Butyrolactone | 78 | 10.9 | 0 | Electrolyte 1 | 10 | Acrylic polymer 3 | 10 | 45 | 14.2 | 2 |
| | 29 | γ-Butyrolactone | 70 | 10.9 | 0 | Electrolyte 1 | 10 | Acrylic polymer 10 | 10 | −15 | 14.5 | — |
| | 30 | γ-Butyrolactone | 78 | 10.9 | 0 | Electrolyte 1 | 10 | Acrylic polymer 10 | 10 | −15 | 14.5 | 2 |
| | 31 | γ-Butyrolactone | 78 | 10.9 | 0 | Electrolyte 1 | 10 | Acrylic polymer 3 | 10 | 45 | 14.2 | 1 |
| | 32 | γ-Butyrolactone | 78 | 10.9 | 0 | Electrolyte 1 | 10 | Acrylic polymer 3 | 10 | 45 | 14.2 | 1 |
| | 33 | γ-Butyrolactone | 84 | 10.9 | 0 | Electrolyte 1 | 10 | Acrylic polymer 10 | 5 | −15 | 14.5 | 1 |
| | 34 | γ-Butyrolactone | 66 | 10.9 | 0 | Electrolyte 1 | 10 | Acrylic polymer 10 | 20 | −15 | 14.5 | 4 |
| | 35 | δ-Valerolactone | 78 | 10.5 | 0 | Electrolyte 1 | 10 | Acrylic polymer 10 | 10 | −15 | 14.5 | 2 |
| | 36 | Sulfolane | 78 | 16.8 | 0 | Electrolyte 1 | 10 | Acrylic polymer 10 | 10 | −15 | 14.5 | 2 |
| | 37 | Ethyl methyl sulfone | 78 | 13.1 | 0 | Electrolyte 1 | 10 | Acrylic polymer 10 | 10 | −15 | 14.5 | 2 |
| | 38 | γ-Butyrolactone | 78 | 10.9 | 0 | Electrolyte 1 | 10 | Acrylic polymer 10 | 10 | −15 | 14.5 | 2 |
| | 39 | γ-Butyrolactone | 78 | 10.9 | 0 | Electrolyte 1 | 10 | Acrylic polymer 10 | 10 | −15 | 14.5 | 2 |
| | 40 | Ethylene glycol monobutyl ether | 78 | 10.2 | 8.5 | Electrolyte 1 | 10 | Acrylic polymer 10 | 10 | −15 | 14.5 | 2 |
| | 41 | γ-Butyrolactone | 78 | 10.9 | 0 | Electrolyte 3 | 10 | Acrylic polymer 10 | 10 | −15 | 14.5 | 2 |
| | 42 | γ-Butyrolactone | 78 | 10.9 | 0 | Electrolyte 1 | 10 | Acrylic polymer 10 | 10 | −15 | 14.5 | — |
| Comparative Examples | 1 | γ-Butyrolactone | 90 | 10.9 | 0 | Electrolyte 1 | 10 | — | — | — | — | — |
| | 2 | γ-Butyrolactone | 95 | 10.9 | 0 | Electrolyte 1 | 5 | — | — | — | — | — |
| | 3 | γ-Butyrolactone | 98.5 | 10.9 | 0 | Electrolyte 1 | 1.5 | — | — | — | — | — |
| | 4 | γ-Butyrolactone | 80 | 10.9 | 0 | Electrolyte 1 | 10 | — | — | — | — | — |
| | 5 | Ethylene glycol | 80 | 17.8 | 32.2 | Electrolyte 1 | 10 | Acrylic polymer 23 | 10 | 85 | 13.8 | — |

TABLE 3-continued

| | | Composition | | | | Physical properties | | Evaluation results | |
|---|---|---|---|---|---|---|---|---|---|
| | | Triethyl borate Amount (parts) | Polyethylene glycol Amount (parts) | Mannitol Amount (parts) | Polyvinyl alcohol Amount (parts) | Difference between SP values of acrylic polymer sand olvent | Weight proportion of water (%) | Capacitor evaluation | |
| | | | | | | | | Conductivity (mS/cm) | Spark voltage (v) |
| Examples | 24 | — | — | — | — | 3.3 | 0.2 | 7.3 | 90 |
| | 25 | — | — | — | — | 3.3 | 0.2 | 1.5 | 320 |
| | 26 | — | — | — | — | 0.5 | 0.2 | 6.0 | 110 |
| | 27 | — | 10 | — | — | 3.3 | 0.2 | 3.8 | 170 |
| | 28 | — | — | — | — | 3.3 | 0.6 | 4.5 | 250 |
| | 29 | — | 10 | — | — | 3.6 | 0.2 | 4.8 | 160 |
| | 30 | — | — | — | — | 3.6 | 0.7 | 5.1 | 260 |
| | 31 | — | — | 1 | — | 3.3 | 0.5 | 4.2 | 240 |
| | 32 | — | — | — | 1 | 3.3 | 0.5 | 4.3 | 210 |
| | 33 | — | — | — | — | 3.6 | 0.2 | 5.9 | 180 |
| | 34 | — | — | — | — | 3.6 | 2.0 | 3.2 | 340 |
| | 35 | — | — | — | — | 4.0 | 0.8 | 5.0 | 250 |
| | 36 | — | — | — | — | 2.3 | 0.8 | 1.5 | 240 |
| | 37 | — | — | — | — | 1.4 | 0.8 | 1.3 | 230 |
| | 38 | — | — | — | — | 3.6 | 0.8 | 5.2 | 250 |
| | 39 | — | — | — | — | 3.6 | 0.8 | 5.8 | 240 |
| | 40 | — | — | — | — | 4.3 | 0.8 | 3.5 | 160 |
| | 41 | — | — | — | — | 3.6 | 0.8 | 2.4 | 280 |
| | 42 | 2 | — | — | — | 3.6 | 0.2 | 5.0 | 220 |
| Comparative Examples | 1 | — | — | — | — | — | 0.2 | 7.4 | 70 |
| | 2 | — | — | — | — | — | 0.2 | 5.1 | 75 |
| | 3 | — | — | — | — | — | 0.2 | 1.6 | 140 |
| | 4 | — | 10 | — | — | — | 0.2 | 5.3 | 85 |
| | 5 | — | — | — | — | 4.0 | 0.2 | 1.5 | 90 |

<Weight Proportion of Water Contained in Electrolyte Solution for an Electrolytic Capacitor>

Regarding the electrolyte solutions of examples and comparative examples, a content of water contained in the electrolyte solution was measured using an automatic moisture measuring device [AQV-300 commercially available from Hiranuma Sangyo Co., Ltd.], and a weight proportion of water to the total weight of the electrolyte solution for an electrolytic capacitor was obtained.

<Conductivity>

Regarding the electrolyte solutions of examples and comparative examples, a conductivity at 30° C. was measured using an electrical conductivity meter CM-40S (commercially available from Dkk-Toa Corporation).

<Spark Voltage>

Cells for measuring a withstand voltage including a 10 cm² chemically etched aluminum foil for a high pressure as an anode, a 10 cm² plain aluminum foil as a cathode, and respective electrolyte solutions of examples and comparative examples as an electrolyte solution were prepared. A load according to a constant current method (2 mA) was applied between the electrodes using a constant voltage-constant current DC power supply device (GP0650-05R commercially available from Takasago Ltd.) at 25° C., and change in voltage over time was measured. In a graph in which a horizontal axis represents time and a vertical axis represents voltage, voltage values for each of elapsed times were plotted, a voltage rising curve was created, and a voltage at a time point at which any of a disturbance to a rising curve due to sparking or a disturbance to a rising curve due to scintillation occurred at first was set as a spark voltage of the electrolyte solution used for measurement. A higher spark voltage indicates a higher withstand voltage of the aluminum electrolytic capacitor using the electrolyte solution.

INDUSTRIAL APPLICABILITY

The electrolytic capacitor using the electrolyte solution for an electrolytic capacitor of the present invention has a high withstand voltage while high conductivity is maintained and thus can be suitably used as a component of electrical appliances and electronic products for which a high drive voltage is required, and is particularly suitable for an electrolyte solution for an electrolytic capacitor for mobile applications such as a laptop and automotive applications.

The invention claimed is:

1. An electrolyte solution for an electrolytic capacitor comprising a solvent containing an organic solvent, an acrylic polymer having hydroxy group and/or carboxy group, and an electrolyte,
    wherein a concentration of hydroxy groups included in the organic solvent is 10 mmol/g or less with respect to the weight of the organic solvent, a glass transition temperature of the acrylic polymer having hydroxy group and/or carboxy group is −80° C. to 56° C., and the acrylic polymer is a polymer that includes a monomer having (meth)acryloyl group and hydroxy group as essential constituent monomers.

2. The electrolyte solution for an electrolytic capacitor according to claim 1,
    wherein the acrylic polymer further comprises a monomer having (meth)acryloyl group and carboxy group as essential constituent monomers.

3. The electrolyte solution for an electrolytic capacitor according to claim 2,
    wherein the monomer having (meth)acryloyl group and carboxy group is at least one monomer selected from the group consisting of an adduct obtained by adding an acid anhydride having 4 to 10 carbon atoms to the monomer having (meth)acryloyl group and hydroxy group, an adduct obtained by adding 1 to 5 mol of a lactone having 2 to 12 carbon atoms to (meth)acrylic acid, and (meth)acrylic acid.

4. The electrolyte solution for an electrolytic capacitor according to claim 2,
wherein a proportion of the total number of moles of the monomer having (meth)acryloyl group and hydroxy group and the monomer having (meth)acryloyl group and carboxy group to the total number of moles of constituent monomers of the acrylic polymer is 0.5 to 100 mol %.

5. The electrolyte solution for an electrolytic capacitor according to claim 1,
wherein the monomer having (meth)acryloyl group and hydroxy group is at least one monomer selected from the group consisting of a hydroxyalkyl (meth)acrylate having 4 to 12 carbon atoms, an adduct obtained by adding 1 to 5 mol of a lactone having 2 to 12 carbon atoms to the hydroxyalkyl (meth)acrylate having 4 to 12 carbon atoms, and an adduct obtained by adding alkylene oxide having 2 to 10 carbon atoms to the hydroxyalkyl (meth)acrylate having 4 to 12 carbon atoms.

6. The electrolyte solution for an electrolytic capacitor according to claim 1,
wherein a weight proportion of the acrylic polymer to the total weight of the electrolyte solution for an electrolytic capacitor is 0.5 to 40 weight %.

7. The electrolyte solution for an electrolytic capacitor according to claim 1,
wherein an absolute value of a difference between a solubility parameter of the acrylic polymer having hydroxy group and/or carboxy group and a solubility parameter of the solvent is 0.1 to 5.0.

8. The electrolyte solution for an electrolytic capacitor according to claim 1,
wherein the organic solvent is a lactone solvent and/or a sulfone solvent.

9. The electrolyte solution for an electrolytic capacitor according to claim 1,
wherein the organic solvent is γ-butyrolactone.

10. The electrolyte solution for an electrolytic capacitor according to claim 1,
wherein the electrolyte solution for an electrolytic capacitor contains water and a weight proportion of water to the total weight of the electrolyte solution for an electrolytic capacitor is 0.01 to 5 weight %.

11. The electrolyte solution for an electrolytic capacitor according to claim 1, further comprising boric acid and/or a borate ester.

12. The electrolyte solution for an electrolytic capacitor according to claim 11,
wherein a proportion of the total weight of the boric acid and the borate ester to the total weight of the electrolyte solution for an electrolytic capacitor is 0.1 to 10 weight %.

13. An electrolytic capacitor, comprising
an anode, a cathode, and a separator disposed between the anode and the cathode, wherein the electrolyte solution according to claim 1 is impregnated into the separator.

* * * * *